Oct. 30, 1928.
H. W. O'NEILL
1,689,292
NAVIGATION DIRECTING SYSTEM
Filed June 25, 1923
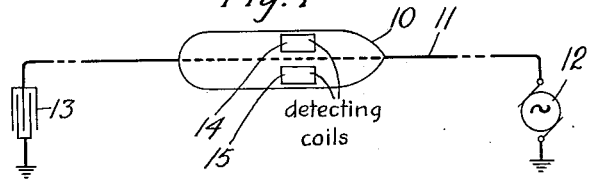
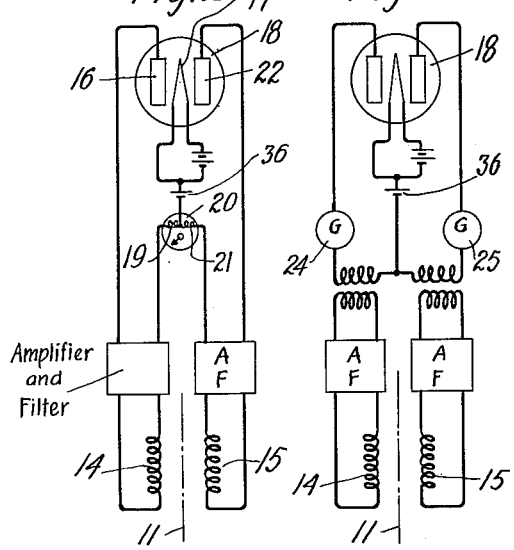
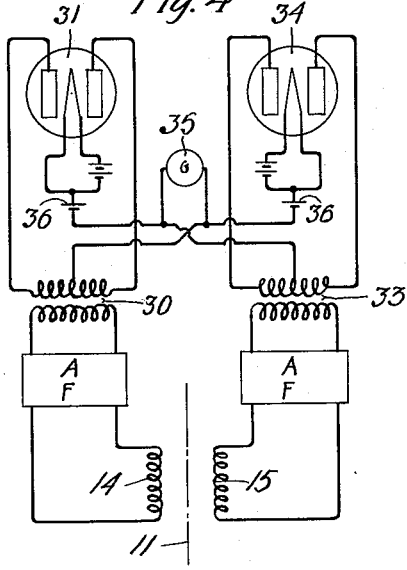
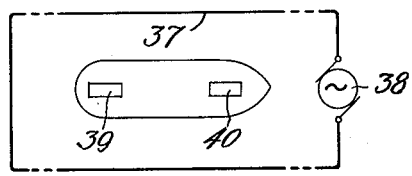
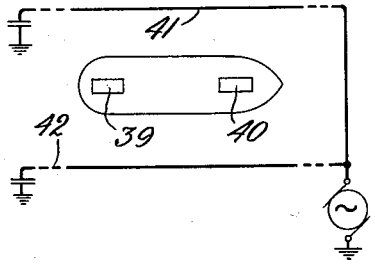
Inventor:
Henry W. O'Neill,
by [signature] Atty Patented Oct. 30, 1928.

1,689,292

UNITED STATES PATENT OFFICE.

HENRY W. O'NEILL, OF BROOKLYN, NEW YORK, ASSIGNOR TO WESTERN ELECTRIC COMPANY, INCORPORATED, OF NEW YORK, N. Y., A CORPORATION OF NEW YORK.

NAVIGATION-DIRECTING SYSTEM.

Application filed June 25, 1923. Serial No. 647,494.

This invention relates to navigation direction systems and more particularly relates to a system for piloting vessels by means of a submerged cable or conductor.

An object of this invention is to provide visible means for indicating the relation of the vessel with respect to the submerged conductor.

A second object is to provide visible means which will not only inform the navigator of the distance between the vessel and the cable but also will indicate the direction in which the vessel should be guided in order to approach the cable.

These objects are accomplished in accordance with one form of this invention by providing a plurality of means oppositely disposed on the vessel and selectively responsive to the signaling frequency current in the submerged cable. The receiving means may, for example, comprise two inductance coils mounted on opposite sides of the vessel and arranged to be responsive to the magnetic field set up by the signaling currents in the cable. The signaling current induced in each of the two inductance windings may be amplified to any suitable degree by vacuum tube amplifiers, for example, after which the amplified signal from each inductance winding is passed through a suitable rectifier and the exciting winding of a galvanometer or other indicating instrument. The galvanometer may, for example, have two exciting windings, the signal from one inductance being impressed upon one of the exciting windings and the signal from the other inductance being impressed upon the other exciting winding. If, with such an arrangement the submerged cable is symmetrically located between the two inductances the system may be so adjusted that the reading of the galvanometer will be zero due to the fact that the currents through the two exciting windings of the galvanometer are equal and opposite. If now the vessel should be in such a position that the two detecting inductances are located on the same side of the cable, there will be a deflection of the galvanometer needle in one direction or the other depending upon which of the detecting inductances is nearer the submerged cable. It therefore follows that by observing the magnitude of the deflection of the galvanometer needle as well as its direction, the vessel may be guided substantially along a course immediately above the submerged conductor.

Referring to the drawings, Fig. 1 represents the normal position of a vessel with respect to a single submerged conductor placed along the course it is desired the vessel should follow. Fig. 2 represents an arrangement which includes a differential galvanometer to be used in guiding a vessel along a submerged cable. Fig. 3 is a modification of Fig. 2 in which separate galvanometers or deflecting means are employed. Fig. 4 is a modification of Fig. 2 in which the differential galvanometer in Fig. 2 is made unnecessary. Fig. 5 illustrates the normal position of a vessel with respect to a metallic circuit or closed loop submerged conductor and Fig. 6 represents the normal position of a vessel with respect to a double submerged conductor grounded at the ends remote from the shore.

Referring to Fig. 1, a vessel 10 is disclosed and it is desired that the vessel 10 should be steered along a course following a submerged conductor 11 which is connected at its shore end to a generator 12 and at its other end is grounded through a large capacity 13, the ground may be, for example, the external sheath of the conductor which is provided for protection purposes. Two detecting coils 14 and 15 are provided on opposite sides of the vessel to enable the navigator to determine the relative position of the vessel 10 with respect to the submerged conductor 11.

One form of the apparatus which may be connected to the coils 14 and 15 is shown in Fig. 2. The detecting coil 14 is shown connected to a suitable filter and amplifying means for selectively amplifying to any desired degree the particular frequency impressed upon the conductor 11 by the source 12. The currents detected by detecting coil 14 after amplification are impressed upon the anode 16 and cathode 17 of a vacuum tube rectifier 18 and the rectified current passing between these electrodes is impressed upon the exciting winding 19 of a differential galvanometer 20. The current present in detecting coil 15 after amplification is impressed upon the exciting winding 21 of the galvanometer in series with the anode 22 and cathode 17 of the rectifier 18. The system may be readily adjusted so that when the vessel is immediately above the conductor 11 and coils 14 and 15 are symmetrically situated with respect to the submerged conductor 11, the currents in the windings 19 and 20 of the galvanometer neutralize each other and give a zero scale of deflection of the galvanometer needle. When, however, the course of the vessel happens to be changed so that the distance between detecting coil 14 and the submerged cable is less than the distance between the detecting coil 15 and the submerged cable, the current in winding 19 of the galvanometer will be greater than the current in winding 20 so that the needle of the galvanometer will be deflected in a definite direction indicating clearly that the vessel is off its course and the cable lies in such a direction that detecting coil 14 is nearer to it than coil 15. Similarly if the vessel should happen to deviate from its course such that coil 15 becomes nearer to the submerged cable than coil 14 the current in winding 21 of the galvanometer will exceed the current in winding 19 and the needle of the galvanometer will consequently be deflected in the oppoiste direction. The navigator of the vessel will therefore be enabled to steer along the course followed by the submerged cable 11 merely by noting the direction and magnitude of the deflection of the galvanometer needle. The system described therefore, is important in the navigation of vessels in harbors, for example, where the channel is narrow or unfamiliar to the pilot or in the case of fogs or at night-time when the land marks usually relied upon by the pilot are not visible. The arrangement described would therefore eliminate the necessity of lighted buoys along a river or other narrow channel.

Fig. 3 is a modification of Fig. 2 which functions in a similar manner except that two galvanometers 24 and 25 are employed individual to the two detecting coils 14 and 15 instead of the single differential galvanometer employed in Fig. 2. The signaling current detected by coil 14 is impressed upon galvanometer 24 while the current detected by coil 15 is impressed upon galvanometer 25. When the submerged cable is symmertically located between the two detecting coils the magnitude of the deflection will be the same for both galvanometers 24 and 25 while the deflection will be greater in one or the other when the submerged cable at any instance becomes nearer one detecting coil than the other. Fig. 3 therefore functions to inform the navigator by a comparison of the deflections of the galvanometers 24 and 25 of the direction the vessel should be steered in order to follow substantially the submerged conductor 11.

In the system shown in Fig. 4 the currents detected by coil 14 after being selectively amplified, are impressed through a suitable transformer 30 upon the double vacuum rectifier tube 31 which rectifies both half-waves of the detected current. Similarly the currents detected by coil 15 after being selectively amplified are impressed through a transformer 33 upon a double rectifier vacuum tube 34 which rectifies both half-waves of the detected currents. The galvanometer 35 is so connected between the cathode of each rectifier and the mid-point of each secondary winding of the two transformers that the current rectified by tube 31 passes through the galvanometer in one direction while the current rectified by tube 34 passes through the galvanometer in the opposite direction. With such an arrangement the deflection of galvanometer 25 will be substantially zero when the submerged cable 11 is centrally located with respect to the detecting coils 14 and 15 while the deflection of the galvanometer will be in one drection or the other when the submerged cable becomes nearer to one of the detecting coils. The operation of the system is therefore essentially the same as that described in detail in connection with Fig. 2 except that the differential galvanometer is not required.

In each of the systems shown in Figs. 2, 3 and 4, a source of voltage 36 is employed so arranged that its positive pole is connected to the cathode of the rectifier while the negative pole is conected to the anode of each rectifier. This source of counter-potential 36 is preferably employed to prevent fluctuations of the galvanometer needle due to the fluctuating space current which tends to be produced in the rectifier tube even when no signaling currents are being received by the detecting coils 14 and 15. The fluctuating space current referred to appears to be inherent in all space discharge tubes having heated filaments and is due, in part, at least, to the space charge effect commonly referred to as the "Edison effect". This phenomenon was first referred to in the patent to Thomas A. Edison, No. 307,031, issued October 21, 1884. This space charge effect may vary widely in different tubes, even when they are of the same type, and also will not be symmetrical with respect to the two sides of the same tube, in the case of tubes such as shown in the drawing. Due to this effect, then, a space current may be produced in the rectifiers 18, 31 and 34 and be effective in causing fluctuations of the galvanometer needles when no plate battery is used, and no signaling variations are being impressed on the tubes. As, in systems of the type covered by this specification, the order of magnitude of the currents to be detected is comparable to that of the currents produced by this space charge effect, unless means are provided for neutralizing the undesired currents, the galvanometer indications oftentimes may be untrustworthy.

The polarity of the source of potential 36 when connected in the circuits in the manner shown in the figures is such as to charge the plate of the rectifier in a negative sense so as to oppose the space charge effect. It has been found that the amount of this negative potential, in general, need only roughly approximate the electromotive force of the space charge in order to nullify the effect of the undesired fluctuations in space current produced thereby. The use of the source 36 therefore produces a much more reliable indication in the galvanometer than would be the case if these undesired fluctuations were permitted, since these undesired fluctuations might in some cases entirely mask the true magnitude and direction of the deflection of the galvanometer needle produced by the signal received from the submerged cable.

It is to be understood, of course, that other visible indicating means may be employed if desired as a substitute for the galvanometer described in connection with the particular embodiments shown in Figs. 2, 3 and 4.

The selective amplification by the use of electric wave filters, for example, is of importance not only in suppressing foreign potentials due to sources other than the currents in the submerged cable but is also of considerable utility when, for example, a plurality of signaling frequencies are simultaneously impressed upon the submerged conductor 11, where one signaling frequency is designed to be received by one vessel, another frequency being adapted to be received by a second vessel for its navigation. A plurality of submerged cables 11 may also be employed in the same harbor, each submerged cable being connected to a source of alternating current of a different frequency whereby each cable may be employed for guiding different vessels or for guiding the same vessel along different channels.

This invention, of course, is not limited in its use to a submerged conductor of the type shown in Fig. 1 but may be used with various types of submerged conductors. For example, in Fig. 5, the submerged conductor 37 is connected to a source of alternating current 38 by a path entirely metallic in which case it may be desirable to place the detecting coils 39 and 40 at the front and rear of the vessel to be guided. The same location of the detecting coils 39 and 40 may be desirable in case the source of alternating current is connected to two grounded cables 41 and 42 connected in parallel as shown in Fig. 6.

The double conductor arrangement of Figs. 5 and 6 may be employed to advantage in the navigation of rivers where instead of submerging the conductors they may be supported along the banks in the form of an open wire line circuit.

It is to be understood that various modifications of this invention may be made without departing any wise from the spirit of this invention as defined in the appended claims.

The invention claimed is:

1. A navigation directing system for a vessel comprising a conductor carrying a current of a certain frequency, a receiving circuit comprising two coils oppositely disposed on the vessel in a field of force emanating from said conductor, means for selectively amplifying the currents induced in said coils by the current in said conductor, a full wave vacuum tube rectifier for rectifying the amplified currents, a differential galvanometer having one winding connected in circuit with one space path of said rectifier so as to be responsive to the rectified currents flowing therethrough, and having a second winding connected in circuit with the other space path of said rectifier so as to be responsive to the rectified currents flowing therethrough, and a source of potential connected in circuit with both space paths of said rectifier so as to oppose the rectified currents therein, for stabilizing the indications of said galvanometer.

2. In a navigation directing system in which the current induced in two coils oppositely disposed on a vessel, by the current in an external conductor, gives an indication of the deviation of the vessel from its course, a circuit comprising means for amplifying the currents induced in said coils, a full wave rectifier of the two-element type, for rectifying said amplified currents, said rectifier having as its only source of plate voltage in the direction to produce current flow therein, said amplified currents applied thereto, a differential galvanometer having one winding connected in circuit with one space path of said rectifier so as to be responsive to the rectified currents flowing therein, and having its other winding connected in circuit with the other space path of said rectifier so as to be responsive to the rectified current flowing therein, and a source of potential common to the two space paths of said rectifier, and so poled and of such magnitude as to nullify the effects on the indications of said galvanometer of locally developed currents due to the inherent characteristics of said vacuum tube rectifier.

In witness whereof, I hereunto subscribe by name this 19th day of June, A. D., 1923.

HENRY W. O'NEILL.